F. HOLIK.
TIRE PROTECTOR.
APPLICATION FILED JUNE 25, 1912.
1,084,434.
Patented Jan. 13, 1914.
2 SHEETS—SHEET 1.
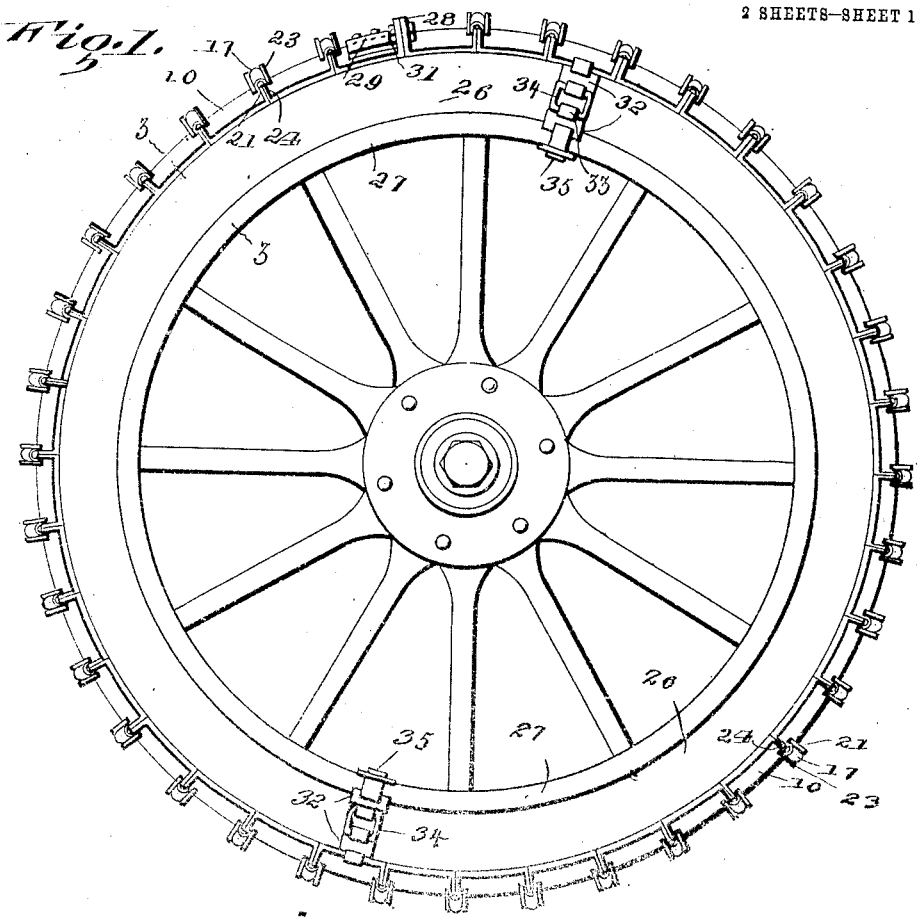
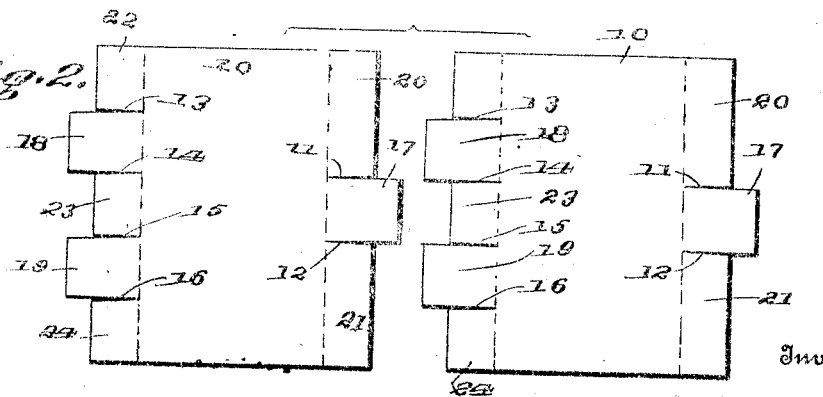
Inventor
F. Holik.
By
Attorneys F. HOLIK.
TIRE PROTECTOR.
APPLICATION FILED JUNE 25, 1912.
1,084,434.
Patented Jan. 13, 1914.
2 SHEETS—SHEET 2.
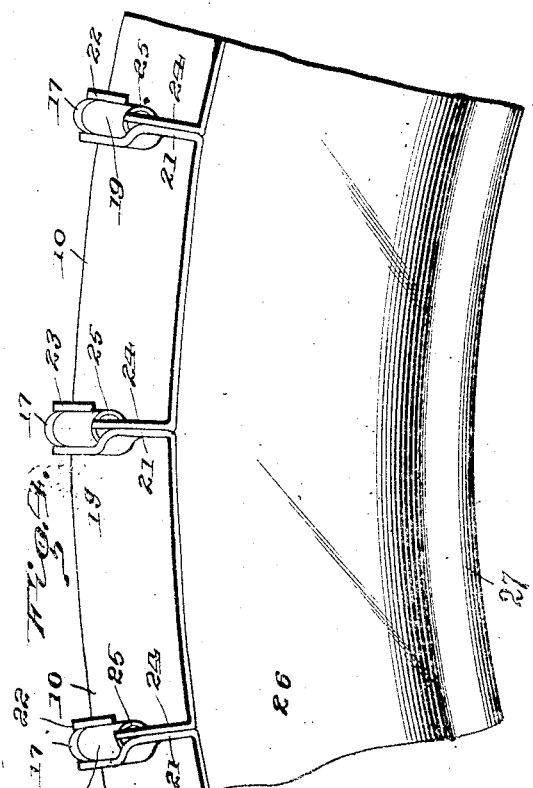
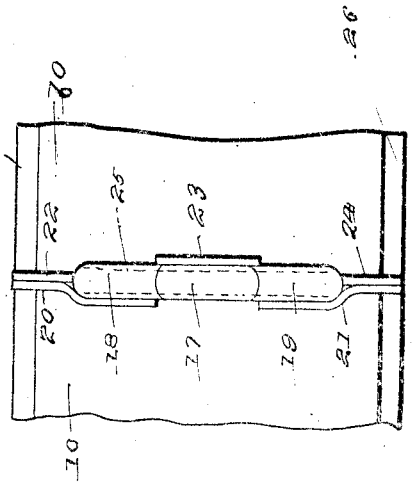
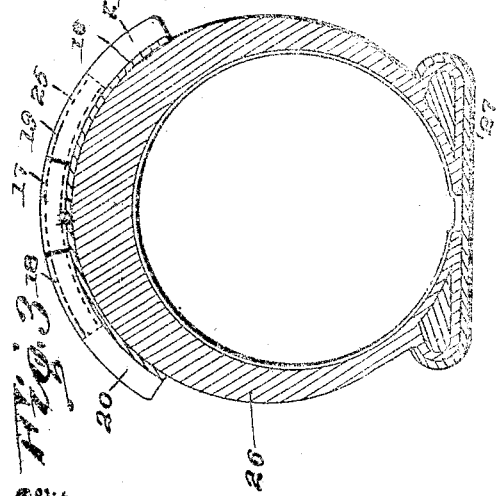
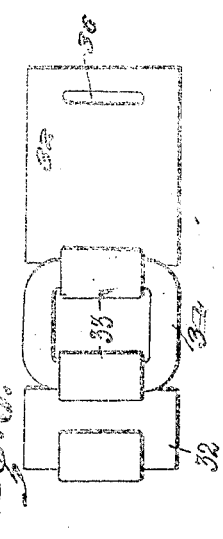
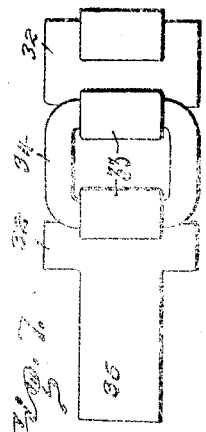

UNITED STATES PATENT OFFICE.

FRANK HOLIK, OF PRAGUE, OKLAHOMA.

TIRE-PROTECTOR.

1,084,434.

Specification of Letters Patent.

Patented Jan. 13, 1914.

Application filed June 25, 1912. Serial No. 705,892.

*To all whom it may concern:*

Be it known that I, FRANK HOLIK, a citizen of the United States, residing at Prague, in the county of Lincoln and State of Oklahoma, have invented certain new and useful Improvements in Tire-Protectors, of which the following is a specification.

This invention relates to attachments for pneumatic tires for protecting the same when riding over rough or muddy roads, and to assist in climbing hills and heavy grades, and has for one of its objects to improve the construction and increase the efficiency and utility of devices of this character.

Another object of the invention is to provide a simply constructed device which may be readily adapted without material structural change to tires of various sizes and to tires having various transverse diameters.

Another object of the invention is to produce a device of this character which may be readily increased or decreased in length and thus adaptable to tires of different diameters.

Another object of the invention is to provide a device of this character which may be readily and quickly attached and detached, and folded into a relatively small space when not in use or when the device is to be transported.

With these and other objects in view, the invention consists in certain novel features of construction as hereafter shown and described, and then specifically pointed out in the claims.

In the drawings illustrative of the preferred embodiment of the invention Figure 1 is a side elevation of a conventional automobile wheel with the improvement applied; Fig. 2 represents a pair of the blanks from which the members composing the tire are constructed; Fig. 3 is an enlarged transverse section on the line 3—3 of Fig. 1; Fig. 4 is a side elevation of the parts shown in Fig. 3; Fig. 5 is a plan view of a part of a portion of the device shown in Fig. 3; Figs. 6 and 7 represent enlarged detail views of the clamping members.

Corresponding and like parts are referred to in the following description and indicated in all the views of the drawings by the same reference characters.

The improved device is constructed from a plurality of "links" or plates united end to end and curved longitudinally to conform to the circumferential curvature of a tire and likewise curved transversely to conform to the transverse curvature of a tire. Each of the links or plates comprises a body portion 10 of sheet or plate metal, preferably steel, and first formed into the shape shown in Figs. 6 and 7, with spaced clefts 11—12 at one end and spaced clefts 13—14—15 and 16 at the other end. The material between the clefts 11—12 is extended beyond the end of the plate 10 to form a relatively long tongue, while the material between the clefts 13—14 and between the clefts 15—16 is likewise extended to form relatively long tongues. By this means a single tongue is formed centrally of the plate 10 at one end and a pair of tongues spaced apart extending from the opposite end of the plate as shown in Figs. 6 and 7. The single tongue at one end of the plate is curved into a pintle-receiving member 17 while the pair of tongues at the opposite end of the plate are curved into pintle-receiving members 18—19. The portions of the material between the pintle-receiving member 17 and the side edges of the plate are bent at right angles to the body of the plate to form ribs or flanges 20—21, while the material between the pintle-receiving members 18—19 and between the pintle-receiving members and the edges of the plate is bent at right angles to the plate to form ribs or flanges 22—23 and 24. The plates 10 are each curved longitudinally to conform to the circumference of the wheel and likewise curved transversely to conform to the transverse curvature of the wheel, so that when the pintle members of the plates are united end to end by the pintles represented at 25, a ring of plates is formed which are connected end to end and adapted to be placed around the wheel and to partly engage around a portion of the outer face, as shown. The plates thus closely engage the outer face of the pneumatic tire, which is indicated conventionally at 26, and connected to the tire rim 27 of the usual construction.

It will be noted that when the plates 10 are united that the pintle-receiving portions 17—18—19 are curved transversely of the tire, while the pintles are likewise curved to correspond thereto. By this means a plurality of transversely extending and curving "ribs" are formed upon the outer face of the tire protector. The flanges or webs 20—21 engage face to face with the flanges 22—23 of the next plate, and are offset as shown, to enable the pintle-receiving portions 18—19 to be disposed in transverse alinement with the pintle-receiving member 17. By this simple means it will be obvious that a simply constructed and compact structure is produced which may be readily adapted to the circumferential and transverse curvature of the tire and to embrace the same closely.

One of the terminal plates is formed with a right-angled rib or flange 28, while the other terminal rib is provided with a supplemental plate 29 which is formed to bear upon the outer face of the plate and riveted or otherwise secured thereto, the rivets or bolts preferably passing through slots in the terminal plate so that the supplemental plate may be adjusted longitudinally to adapt the device to tires of various sizes. The flange 28 and the flange of the plate 29, are apertured to receive clamp bolts or other suitable fastening devices 31, to enable the united plates to be clamped around the tire. Additional fastening means are likewise employed and consist of yieldable members hingedly united to certain of the plates and extending around the tire 26 and the rim 27, as shown, and secured in place in any suitable manner, preferably by forming one of the yieldable members with a slot and the other yieldable member with a tongue which is passed through the slot and bent around the same.

In Figs. 6 and 7, the members comprising the above-described clamp device, are shown and consist of a plurality of plates 32 having tongues 33 adapted to be rolled around links 34. One of the terminal plates 32 is provided with a relatively long tongue 35, while the terminal plate of the other fastening member is provided with a slot 36 to receive the tongue 35. The yieldable fastening devices will be of sufficient length to pass around the pneumatic tire 26 and beneath the rim 27 to bring the terminal of the plate having the slot 36 and the terminal of the plate having the tongue 35 beneath the rim 27, so that when fastened in position the fastening device will be disposed against the inner face of the rim and thus protected from dislocation or injury when in use.

Any required number of the fastening devices may be employed, but for the purpose of illustration two are shown, but it will be understood that any required number may be used.

Having thus described the invention, what is claimed as new is:

1. A tire protector comprising a plurality of curved plates each having a plurality of outwardly directed flanges spaced apart at the ends and with the material between the flanges rolled into curved sockets, and curved pintles engaging through the sockets, the flanges and sockets of the different plates engaging face to face when the plates are arranged end to end.

2. A tire protector comprising a plurality of plates having longitudinally directed clefts in the ends spaced apart, portions of the metal between the clefts being rolled into pintle engaging sockets and the remaining portions of the ends of the plates bent laterally to form bearing flanges, and pintles extending through said sockets, whereby the plates are united with the flanges and the pintle engaging members arranged to engage face to face.

In testimony whereof I affix my signature in presence of two witnesses.

FRANK HOLIK. [L. S.]

Witnesses:
JAKE ZABLOUDIL,
J. W. SMITH.